US012620849B2

(12) United States Patent
Roberts

(10) Patent No.: US 12,620,849 B2
(45) Date of Patent: May 5, 2026

(54) BRUSHLESS ALTERNATOR

(71) Applicant: RAPID POWER INDUSTRIES, Salisbury (AU)

(72) Inventor: Mark Roberts, Salisbury (AU)

(73) Assignee: RAPID POWER INDUSTRIES, Salisbury (AU)

( * ) Notice: Subject to any disclaimer, the term of this patent is extended or adjusted under 35 U.S.C. 154(b) by 280 days.

(21) Appl. No.: 18/258,191

(22) PCT Filed: Dec. 16, 2021

(86) PCT No.: PCT/AU2021/051502
§ 371 (c)(1),
(2) Date: Jun. 16, 2023

(87) PCT Pub. No.: WO2022/126193
PCT Pub. Date: Jun. 23, 2022

(65) Prior Publication Data
US 2024/0313593 A1    Sep. 19, 2024

(30) Foreign Application Priority Data
Dec. 17, 2020    (AU) ................................. 2020904706

(51) Int. Cl.
*H02K 1/22*        (2006.01)
*H02K 1/24*        (2006.01)
(Continued)

(52) U.S. Cl.
CPC ............. *H02K 1/223* (2013.01); *H02K 1/243* (2013.01); *H02K 3/28* (2013.01); *H02K 3/528* (2013.01);
(Continued)

(58) Field of Classification Search
CPC .......... H02K 1/223; H02K 1/243; H02K 3/28; H02K 11/25; H02K 3/528; H02K 19/24;
(Continued)

(56) References Cited

U.S. PATENT DOCUMENTS 2,525,495 A * 10/1950 Lynn ...................... H02K 19/38
310/59
4,882,515 A * 11/1989 Radomski .............. H02K 21/14
310/263
(Continued)

FOREIGN PATENT DOCUMENTS

DE        102008011465 A1    9/2009
EP           3480937 A1    5/2019
(Continued)

OTHER PUBLICATIONS

European Search Report, as issued in connection with European Patent Application No. 21904662, dated Nov. 14, 2024.
(Continued)

*Primary Examiner* — Ahmed Elnakib
(74) *Attorney, Agent, or Firm* — Maschoff Brennan

(57)        ABSTRACT
A vehicle brushless alternator assembly that includes a claw pole rotor assembly having a pair of opposing pole pieces. The rotor defining an axis of rotation, each of the pole pieces having multiple circumferentially spaced pole fingers extending axially. The pole fingers of the rotor alternating between north and south magnetic polarities upon energization of a field coil. The assembly including a cylindrical stator including armature enveloping the magnetic claw poles, the stator arranged coaxially relative to the drive shaft. The field coil positioned relative to said rotor to generate magnetic flux and the field coil including a first field winding electrically connected with a second field winding by a switch such that: in a first operable configuration the switch operates to electrically connect the field
(Continued)

windings in series during energization and in a second operable configuration the switch operates to electrically connect the field windings in parallel during energization.

10 Claims, 14 Drawing Sheets

(51) Int. Cl.

| *H02K 3/28* | (2006.01) |
|---|---|
| *H02K 3/52* | (2006.01) |
| *H02K 11/25* | (2016.01) |
| *H02K 21/04* | (2006.01) |
| *H02P 9/30* | (2006.01) |

(52) U.S. Cl.

CPC .......... *H02K 11/25* (2016.01); *H02K 21/044* (2013.01); *H02P 9/302* (2013.01)

(58) Field of Classification Search

CPC ...... H02K 19/26; H02K 9/06; H02K 2213/09; H02K 1/06; H02K 1/16; H02K 1/18; H02K 3/50; H02K 21/021; H02K 21/044; H02P 9/302; H02P 9/305

See application file for complete search history.

(56) References Cited

U.S. PATENT DOCUMENTS

| 5,130,590 A | 7/1992 | Sugiura |
|---|---|---|
| 5,444,321 A | 8/1995 | Honda et al. |
| 6,066,941 A * | 5/2000 | French ...................... H02P 9/30 |
| | | 322/90 |
| 2002/0163274 A1 | 11/2002 | Kusase et al. |
| 2003/0164651 A1* | 9/2003 | Tornquist ................. H02K 9/19 |
| | | 310/61 |
| 2004/0012354 A1* | 1/2004 | Krefta ..................... F02N 11/00 |
| | | 318/400.41 |
| 2006/0192533 A1 | 8/2006 | Kimura et al. |
| 2013/0234678 A1 | 9/2013 | Patterson et al. |
| 2019/0334424 A1* | 10/2019 | Takahashi ............ H02K 15/022 |
| 2024/0313593 A1* | 9/2024 | Roberts ................... H02K 3/28 |

FOREIGN PATENT DOCUMENTS

| JP | S5242207 U | | 3/1975 |
|---|---|---|---|
| JP | S59159178 U | | 10/1984 |
| JP | 2016086622 | * | 5/2016 |

OTHER PUBLICATIONS

International Search Report and Written Opinion, as issued in connection with International Patent Application No. PCT/AU2021/051502, dated Mar. 2, 2022.

* cited by examiner 455
450
430
400

400
430
450
455

400

410          420

330          300          400

BRUSHLESS ALTERNATOR

TECHNICAL FIELD

The present invention relates to vehicle alternators and more particularly to brushless alternators.

BACKGROUND

Any references to methods, apparatus or documents of the prior art are not to be taken as constituting any evidence or admission that they formed, or form part of the common general knowledge.

Most motor vehicles include an alternator that transforms mechanical energy into electrical energy that is used to charge an on-board battery. Generally, alternators fall into two categories: brushed alternators, and brushless alternators.

Brushed alternators include a rotor having rotor windings that is rotated within a stator. The rotor includes a pair of slip rings that are electrically coupled to the rotor windings, that when energized create rotating magnetic fields. The slip rings are in sliding contact with stationary brushes. With this arrangement, rotation of the rotor relative to the stator passes magnetic fields through the stator winding creating a current in the stator. The current is conditioned and employed to charge a battery or support vehicle electrical loads.

Brushless alternators work in the same way as brush type alternators except that there are no brushes to carry current. Brushless alternators include a main alternator and an exciter having a stationary field winding. In the exciter, the field winding creates magnetic fields in the rotor as the rotor rotates in close proximity to a large core mounted on the rotor shaft. The main alternator includes a rotor and a stationary armature or stator. Varying current through the exciter field coil varies output from the stator. The output is rectified by a stationary rectifier assembly mounted to the machine thereby creating a DC current. A portion of the DC current is passed back to the field winding to establish an alternator output. The alternator output is then employed to charge a vehicle battery or support vehicle electrical loads.

One of the problems associated with creating high current in alternators (brushed and brushless) relates to overheating of internal components. Overheating is caused by many factors including but not limited to high ambient temperatures within the engine bay and insufficient movement of internal cooling air when operating at low RPMs and high electrical loads. Consequently it is desirable to provide a method and apparatus for controlling the alternator temperature in these circumstances.

SUMMARY OF INVENTION

In an aspect, the invention provides a vehicle brushless alternator assembly comprising:

a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil;

a cylindrical stator comprising armature enveloping the magnetic claw poles, the stator arranged coaxially relative to the drive shaft;

the field coil structured to be positioned relative to said rotor to generate magnetic flux upon being energized, the field coil comprising at least a first field winding electrically connected with at least a second field winding by a switching arrangement such that:

in a first operable configuration the switching arrangement operates to electrically connect the first and second field windings in series during energization and;

in a second operable configuration the switching arrangement operates to electrically connect the first and second field windings in parallel during energization.

In another aspect, the invention provides a vehicle brushless alternator assembly comprising:

a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil;

a cylindrical stator comprising armature enveloping the magnetic claw poles, the stator arranged coaxially relative to the drive shaft;

the field coil structured to be positioned relative to said rotor to generate magnetic flux upon being energized, the field coil comprising at least a first field winding electrically connected with at least a second field winding by a switching arrangement such that:

in a first operable configuration the switching arrangement operates to electrically connect the first and second field windings in series during energization and;

in a second operable configuration the switching arrangement operates to electrically disconnects the second field winding from the first field winding to result in energization of the first field winding without energizing the second field winding.

In an embodiment, the brushless alternator further comprises a sensor assembly operatively coupled to the switching arrangement for switching between the first and second operable configuration, in response to sensing changes in one or more predetermined parameters.

In an embodiment, the sensor assembly comprises one or more temperature sensors such that when temperature sensed by the one or more sensors exceeds a predetermined limit, the switching arrangement switches the field coil from the first operable configuration to the second operable configuration.

In an embodiment, the one or more temperature sensors are positioned within an internal volume of a housing enclosing the stator and the rotor.

In an embodiment, each of the first field winding and the second field winding provide substantially equal electrical resistance to the flow of current.

In an embodiment, the terminal ends of the first and second field winding terminate on a connector assembly positioned relative to the housing to allow the user to switch between the first and second operable configurations.

In an embodiment, the connector assembly comprises a plurality of electrical terminals such that:

electrically connecting a set of the terminals in a first sequence results in operation of the switching arrangement in the first operable configuration; and electrically connecting a second set of the terminals in a second sequence results in operation of the switching arrangement in the second operable configuration.

In an embodiment, at least the first coil winding is electrically connected to a voltage regulator and wherein the second coil winding is not electrically connected to a voltage regulator.

In another aspect, the invention provides a vehicle brushless alternator assembly comprising:

a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil;

a cylindrical stator comprising armature enveloping the magnetic claw poles, the stator arranged coaxially relative to the drive shaft;

the field coil structured to be positioned relative to said rotor to generate magnetic flux upon being energized, the field coil comprising at least a first field winding electrically connected with at least a second field winding wherein the second coil winding is electrically connected to a boost controlling module, the boost controlling module being arranged to:

energize the second coil winding, in a boosting mode, to increase the magnetic flux generated by the field coil; and energize the second coil winding in an opposite polarity relative to the first coil winding, in a reductive mode, to reduce the magnetic flux generated by the field coil.

In an embodiment, the field coil is adapted to be positioned coaxially within an internal cavity of said rotor to arrange the field coil in a spaced apart relationship relative to internal walls defining the internal cavity of the said rotor; and a housing assembly surrounding said cylindrical stator with the drive shaft being supported by the housing assembly wherein the field coil is fixedly mounted to the housing assembly.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1A:
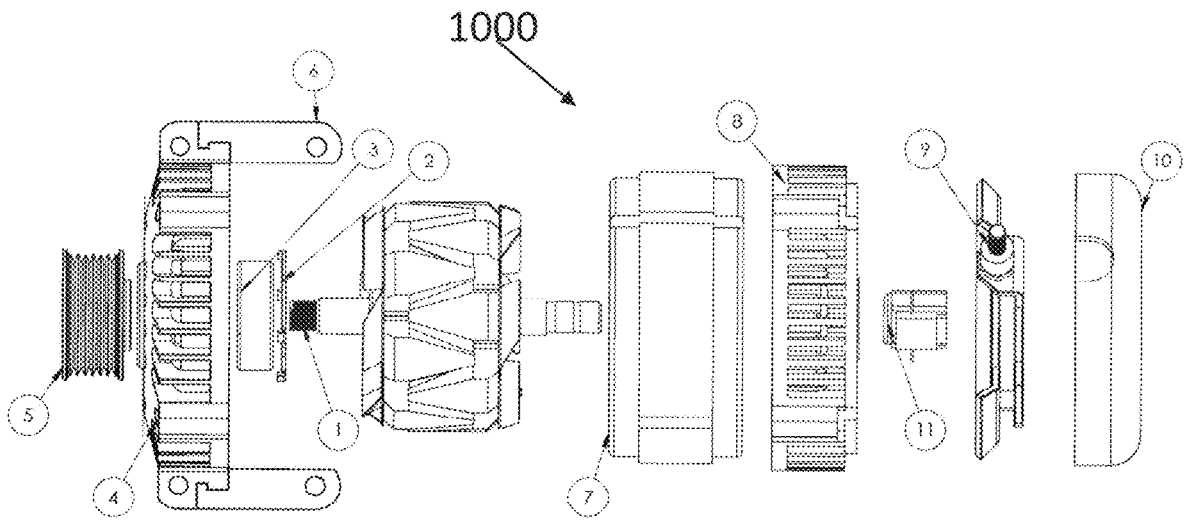
FIGS. 1A and 1B illustrate an example exploded view of a brushed alternator.
Figure 1B:
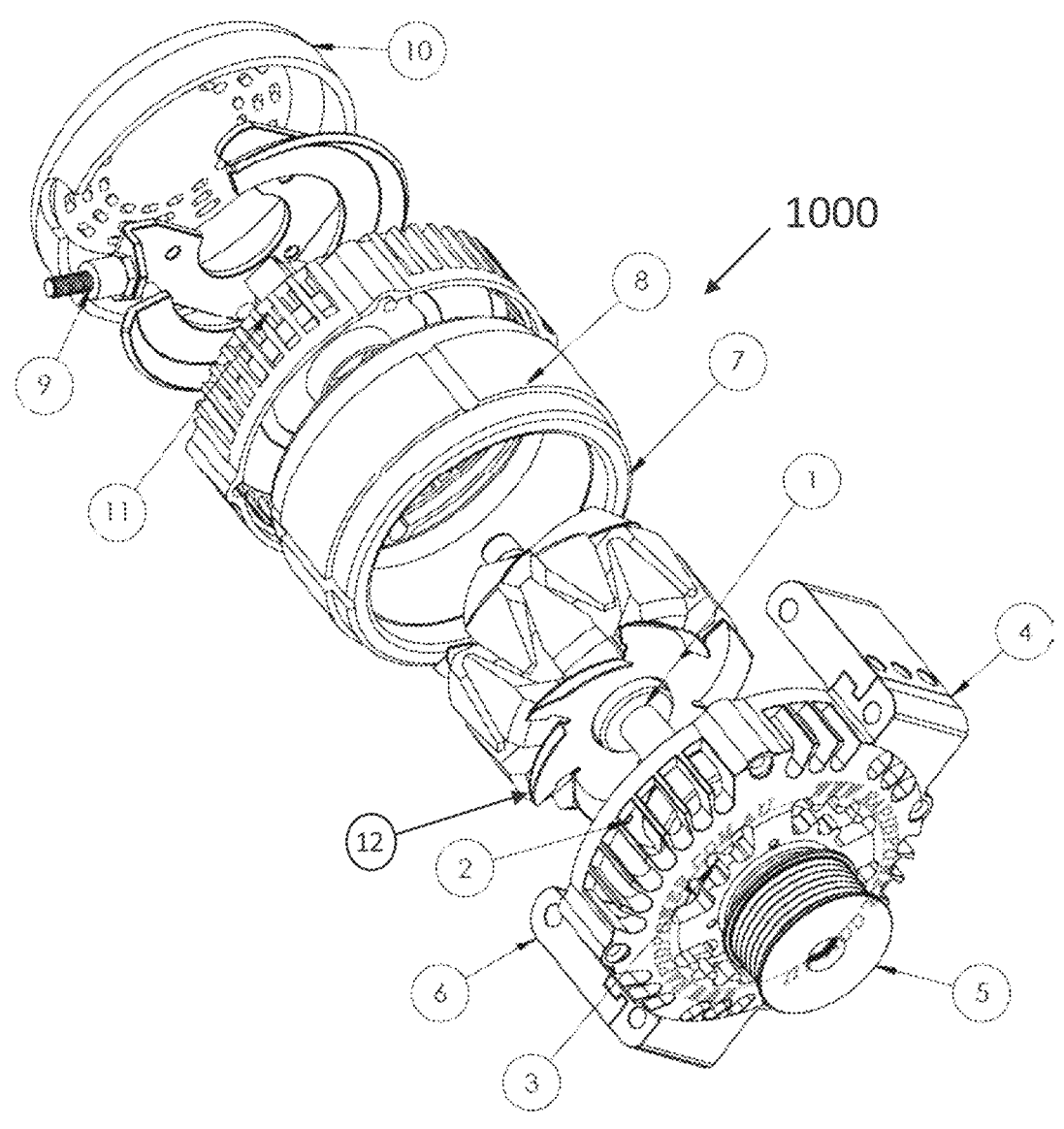

FIGS. 1A and 1B illustrate an exploded view of a known brushed alternator 1000 (such as but not limited to a Denso Alternator) which shall undergo conversion into a brushless alternator 100 (shown in FIGS. 1C and 1D) in accordance with an exemplary embodiment. The brushed alternator 1000 of the preferred embodiment comprises a stator 7 composed of a wire wound armature. The brushed alternator 1000 also comprises a rotor 1, which is composed of a field winding, and which is disposed against the inner circumference side of the stator 7 when fully assembled. The brushed alternator 1000 also comprises a front bearing 3 for supporting rotation of the rotor 1, and a flange 2 disposed axially with the front bearing 3 for locating the front bearing 3. The vehicle alternator 1000 may further comprises cooling fan 12 which is fixed to an axial end face of the rotor 1, and which functions as a means for generating cooling air as the rotor 1 rotates. The brushed alternator 1000 also comprises a housing assembly including front-side housing 4, and intermediate housing 8 and a rear-side housing 10 that support the stator 7 and the rotor 1, a brush assembly for providing power to the field winding of the rotor 1, a voltage regulator for controlling output voltage to a predetermined value. The brushed alternator 1000 also comprises a rear bracket having an electrical output terminal 9 for outputting generated energy, as well as a fan 12 disposed at the front of the rotor 1. The brushed alternator 1000 further comprises a brush holder 11 that covers electrical components such as the brush assembly and the voltage control apparatus to protect them from foreign objects, and a pulley 5 that transmits rotary driving force from an engine (not shown) to the rotor 1.

The front-side housing 4 is provided at its side portion with a plurality of cooling air exhaust vents. These cooling vents are provided to exhaust the cooling air to the outside of the front-side housing 4, which is generated by the rotation of the cooling fan 35 disposed at the side of the pulley 5 and is flowing in the centrifugal direction. The rear-side housing 10 is also provided at its side portion with a plurality of cooling air exhaust windows. These cooling air exhaust windows also function to exhaust the cooling air to the outside of the rear-side housing 10, which is generated by the rotation of the cooling fan being disposed at the side of the rear cover 11, and is flowing in the centrifugal direction. The front-side housing 4 is also provided mounting extensions 6 for mounting the alternator 1000 to an engine (not shown).

A pair of slip rings are fixedly provided to a rotary shaft of the rotor 1 at its one end, which rotate with the rotary shaft. The brush assembly comprises the brush holder 11 that accommodates the slip rings and a pair of brushes each of which is in slide contact with one of the slip rings. The brush assembly also typically comprises a slip ring cover that covers the outer circumference of the slip rings in cooperation with the brush holder assembly.

The rear cover 10 is mounted to cover such electrical components in order to protect them from foreign objects that accommodate the brushes of the brush assembly, particularly the brush apparatus and the voltage control apparatus which are mounted outside the rear-side housing 10. The brush holder assembly has not been described in detail and as will be evident throughout the description, the presently described invention. in at least one embodiments, shows a method and assembly for converting a brushed alternator 1000 into a brushless alternator 100 by utilizing a number of parts from the brushed alternator 1000 without suffering any drop in electrical output.

In an initial step, the bolts that hold the housing assembly, particularly the front and rear housing covers 4 and 10 are removed to expose the stator 7. The electrical connections for the stator 7 are then uncoupled to remove the stator 7 and expose the rotor 1 and the fans 12. The next step involves removing the brush holder assembly. The bolts that are used for mounting the brush assembly may be re-used for mounting the replacement field coil 400 as will be explained in more detail. The removal of the brush assembly is followed by incorporation of the brushless components which are the subject of the presently described embodiment. The replacement brushless components for the brushless alternator 100 include a replacement rotor 300 (shown in FIGS. 1C, 1D and 2 to 5) and a field coil 400 shown in FIGS. 1C, 1D and FIGS. 7 to 9 which may be assembled with the stator 7 and the housing assembly and all other components from the brushed alternator 1000 to provide a repurposed brushless alternator 100 with similar electrical capacity.

Figure 1C:
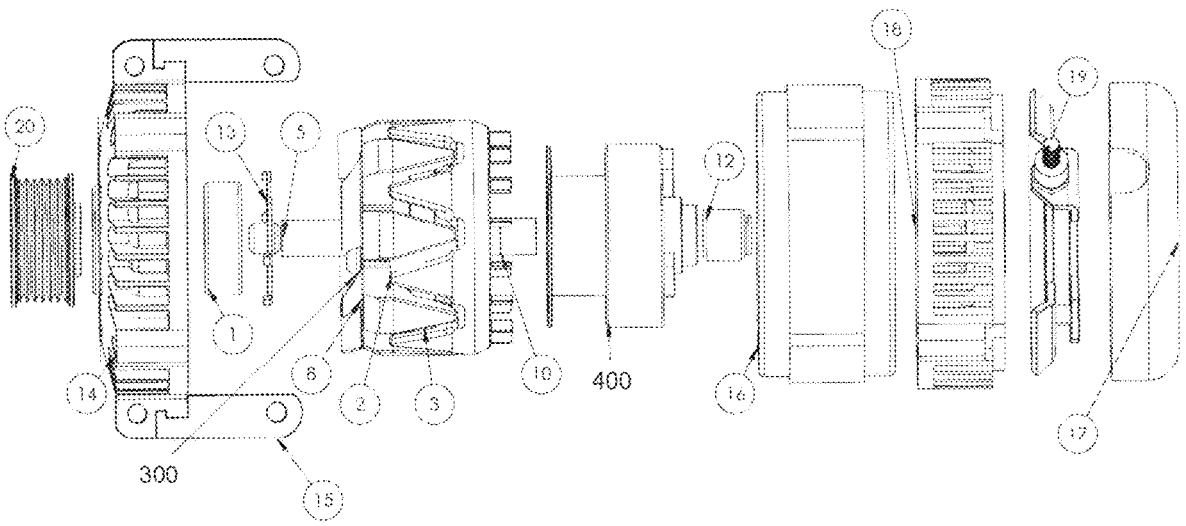
FIGS. 1C and 1D illustrate an example exploded view of a brushless alternator.
Figure 1D:
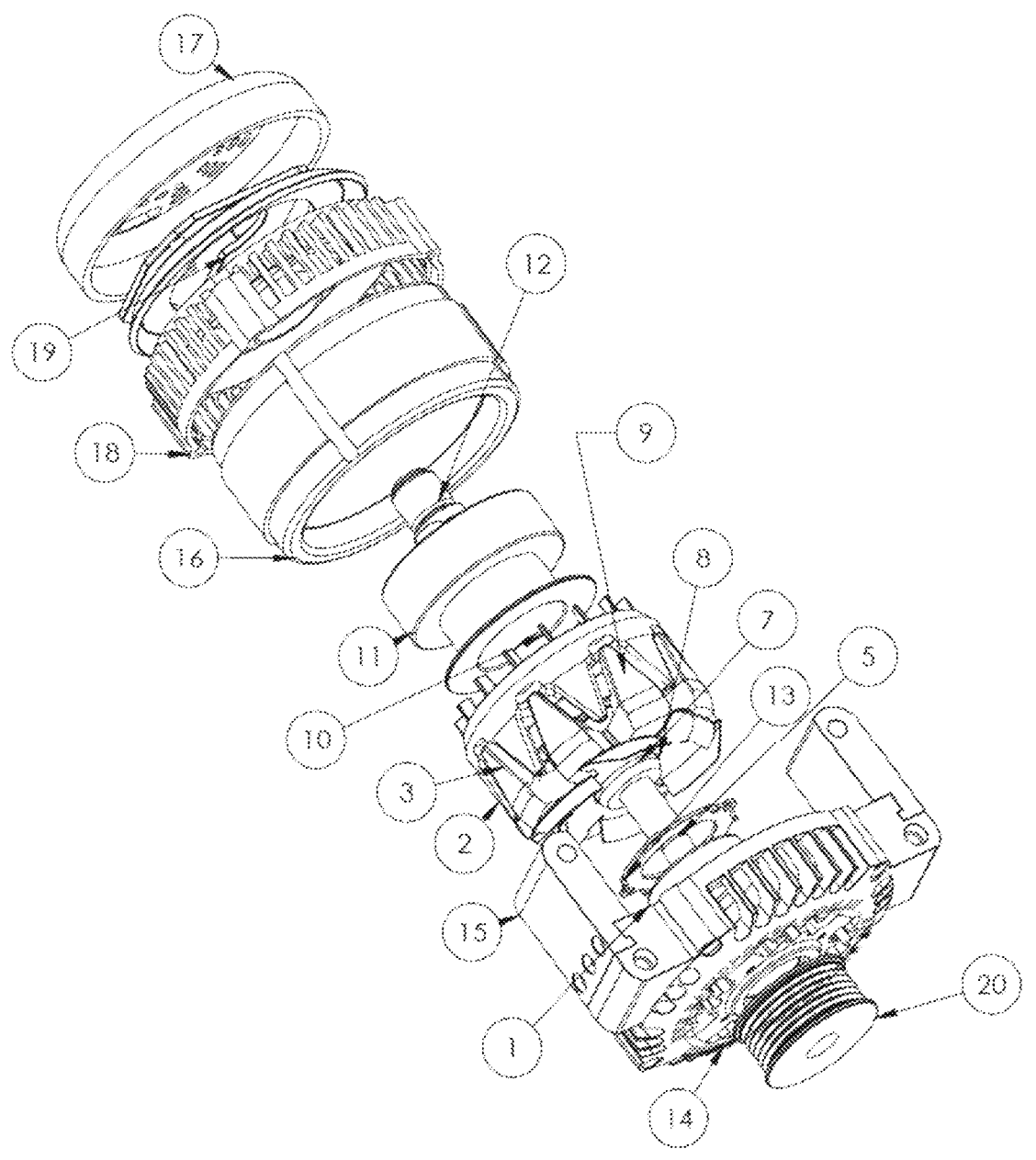

The brushless alternator 100 also includes, as shown in FIG. 1C and 1D: a front bearing 1 for supporting rotation of the rotor 300, a flange 13 disposed axially with the front bearing 1 and having an inner circumference 5, a pulley 20 that transmits rotary driving force from an engine (not shown) to the rotor 300, a rear bearing 12 for supporting rotation of the field coil 400, a front-side housing 14 having mounting extensions 15 for mounting the alternator 100 to an engine (not shown), a middle casing 16 for partially encasing the rotor 300 and field coil 400, an intermediate housing 18 for positioning between the front-side housing 14 and rear-side housing 17, as well as a rear bracket 19 having an electrical output terminal for outputting generated energy. FIG. 1C and 1D also show the brushless alternator 100 including a lip 7 and extension 8 extending around the drive shaft 330 of the rotor 300, different pole pieces 2, 3 of the rotor 300, each comprising at least one pole finger 8, explained in further detail below, as well as a fan 8 mounted to the front of the rotor 300. Moreover, a front surface 10 and intermediate surface 11 of the field coil 400 are indicated too.

Figure 2:
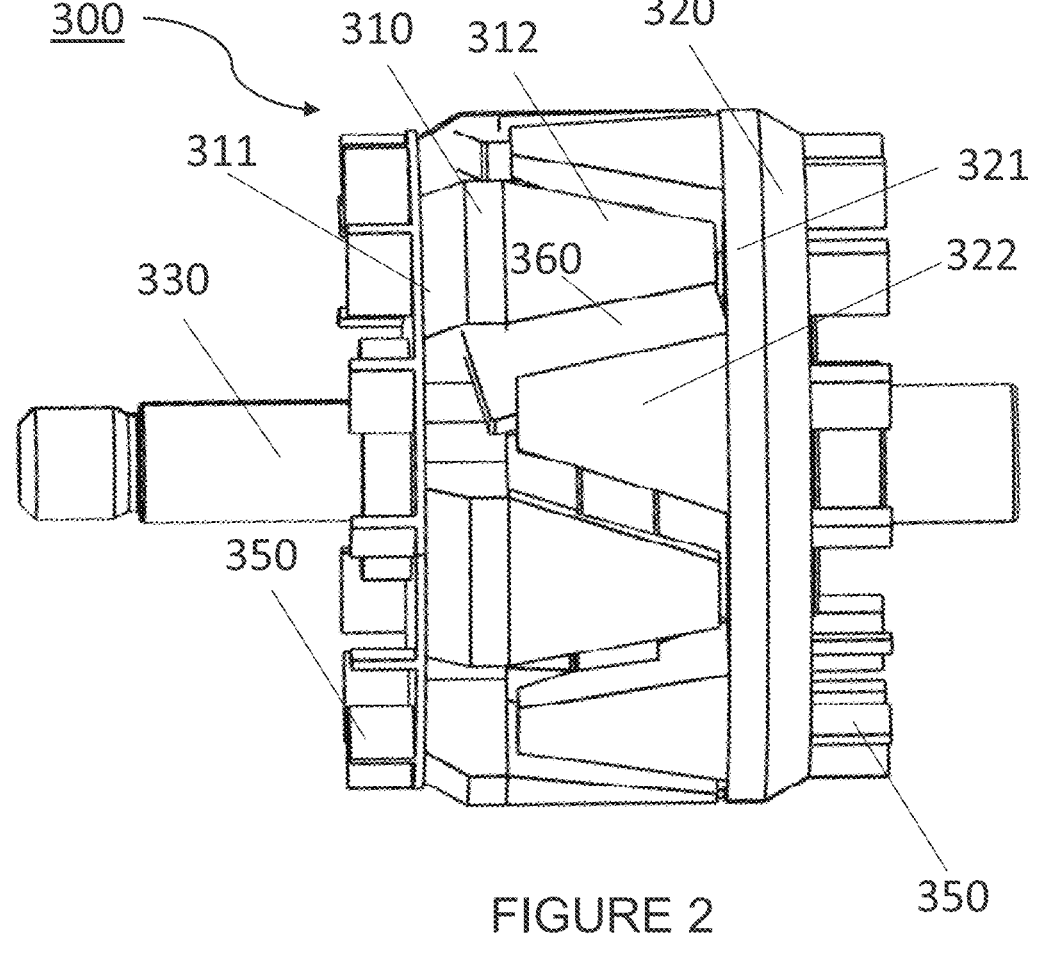
FIG. 2 illustrates a first view of an example rotor.

Referring to FIG. 2 in particular, the rotor 300 is in the form of a claw pole rotor assembly having a pair of opposing pole pieces 310 and 320 with the rotor 300 defining an axis of rotation along a shaft 330. Each pole piece 310 and 320 comprises a plurality of circumferentially spaced pole fingers 312 and 322 respectively (which are trapezoidal or triangular in shape) extending axially. The pole fingers 312 and 322 for each pole piece alternate between north and south magnetic polarities upon energization of the field coil 400 that is positioned coaxially within an internal cavity 340 of the rotor to arrange the field coil in a spaced apart relationship relative to internal walls defining the internal cavity of the rotor 300. The provision of the internal cavity 340 allows the field coil 400 to be accommodated within the space overall internal volume as the alternator 10.

Figure 9:
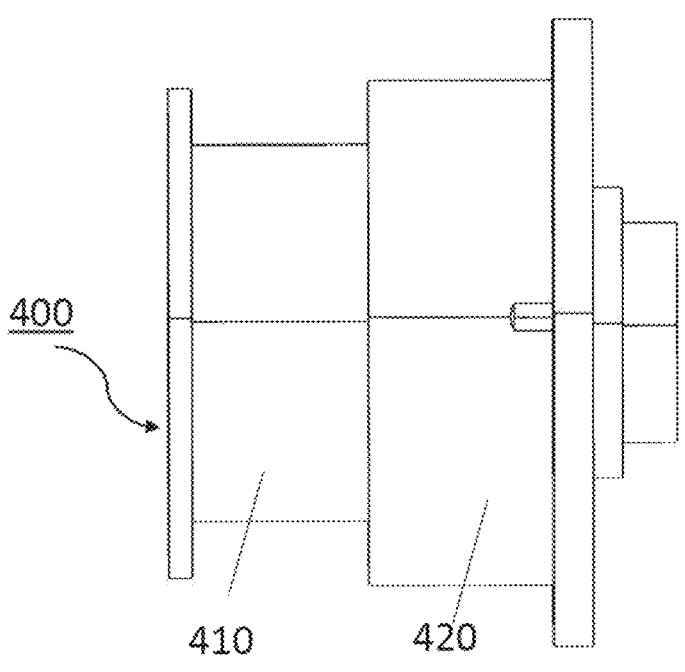
FIG. 9 illustrates another view of the field coil of FIG. 7.
Figure 10:
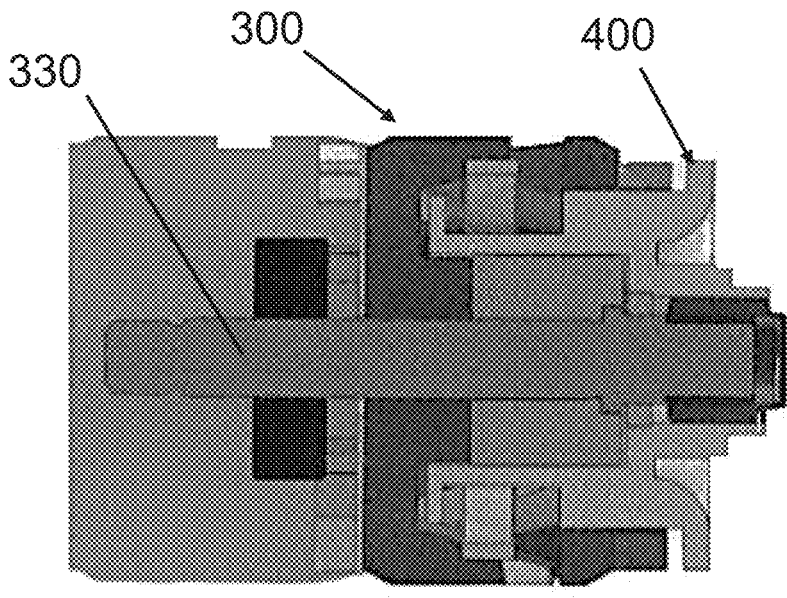
FIG. 10 illustrates a cross-sectional view of a portion of an example alternator assembly.

The internal cavity 340 is substantially cylindrical and allows the field coil 400 to be positioned between shaft 330 and internal walls defining the cavity internal cavity 340 of the rotor 300. The field coil 400 comprises first and second cylindrical portions 410 and 420 that are configured to be positioned within the internal cavity in a spaced apart relationship relative to internal walls of the internal cavity 340 of the rotor 300. FIG. 9 depicts isolated views for the field coil 400 which shows that the first portion 410 of the field coil 400 comprises a first cylindrical portion with a smaller radius relative to a slightly more enlarged second portion 420 with a greater radius with a bore 430 extending therethrough to accommodate the passage of the shaft of the brushless rotor 300. Each of the axial ends of the field coil 400 include circumferential flanges and a medial surface 450 of the field coil includes bolt holes 455 for receiving bolts that can be used for fixedly attaching the field coil 400 to the housing assembly, particularly the rear housing 4b whilst maintaining a spaced relationship between the field coil 400 and the rotor 300. The shape and configuration of the field coil 400 may vary depending upon the electrical requirements. For example, a field coil rated at 150 amperes is expected to be larger (a larger second portion 420) than a field coil rated at 90 amperes. The location of the bolt holes on the medial surface of the field coil 400 assists with fixed attachment of the field coil 400 relative to the housing 4.

Figure 5:
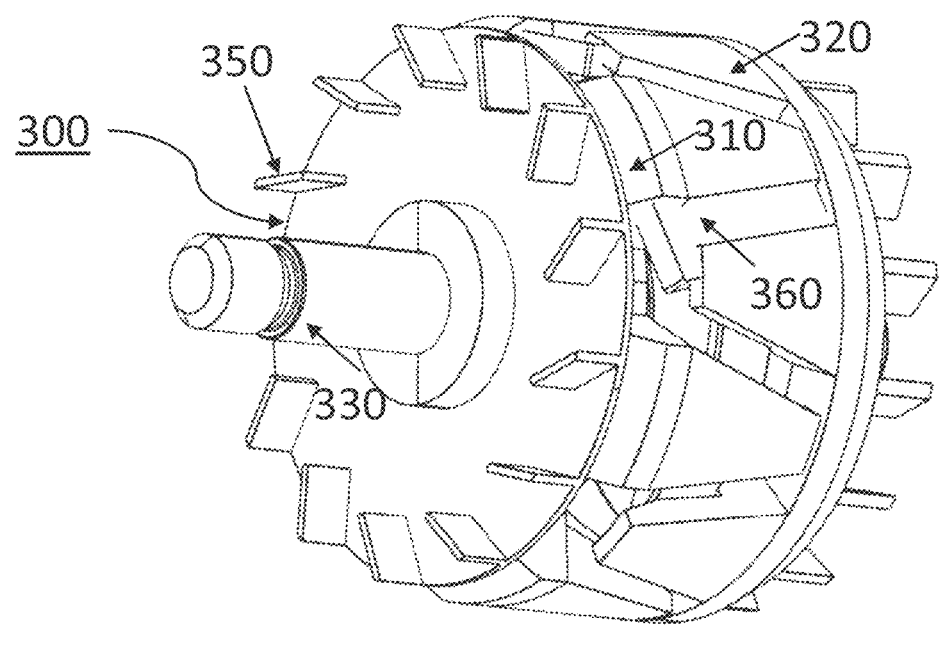
FIG. 5 illustrates another view of the rotor of FIG. 2.
Figure 6:
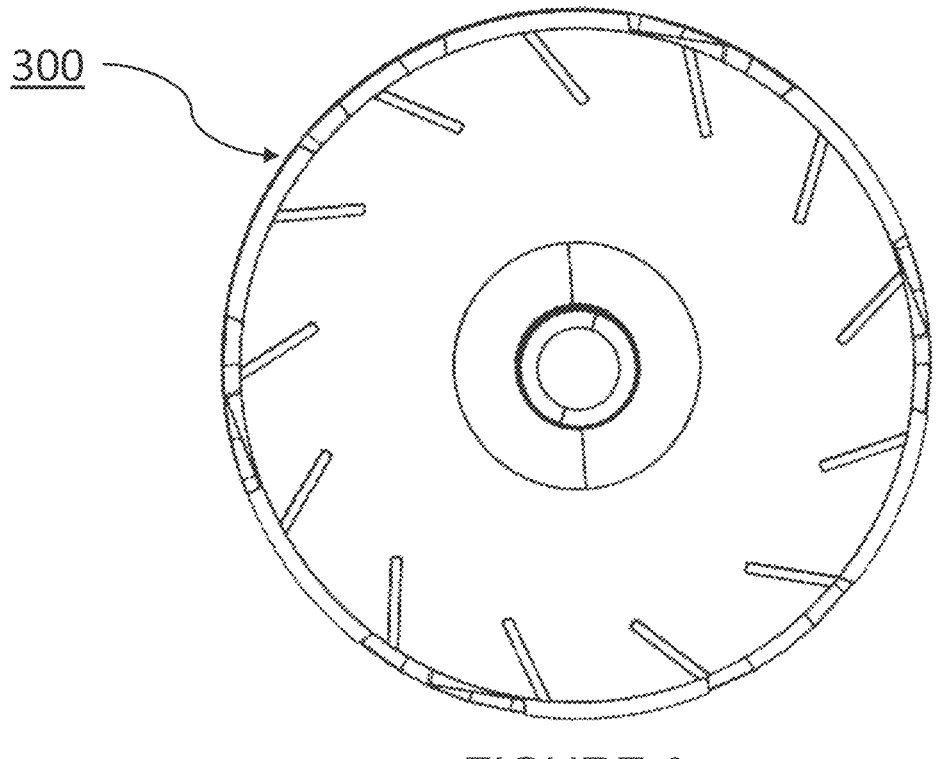
FIG. 6 illustrates another view of the rotor of FIG. 2.
Figure 7:
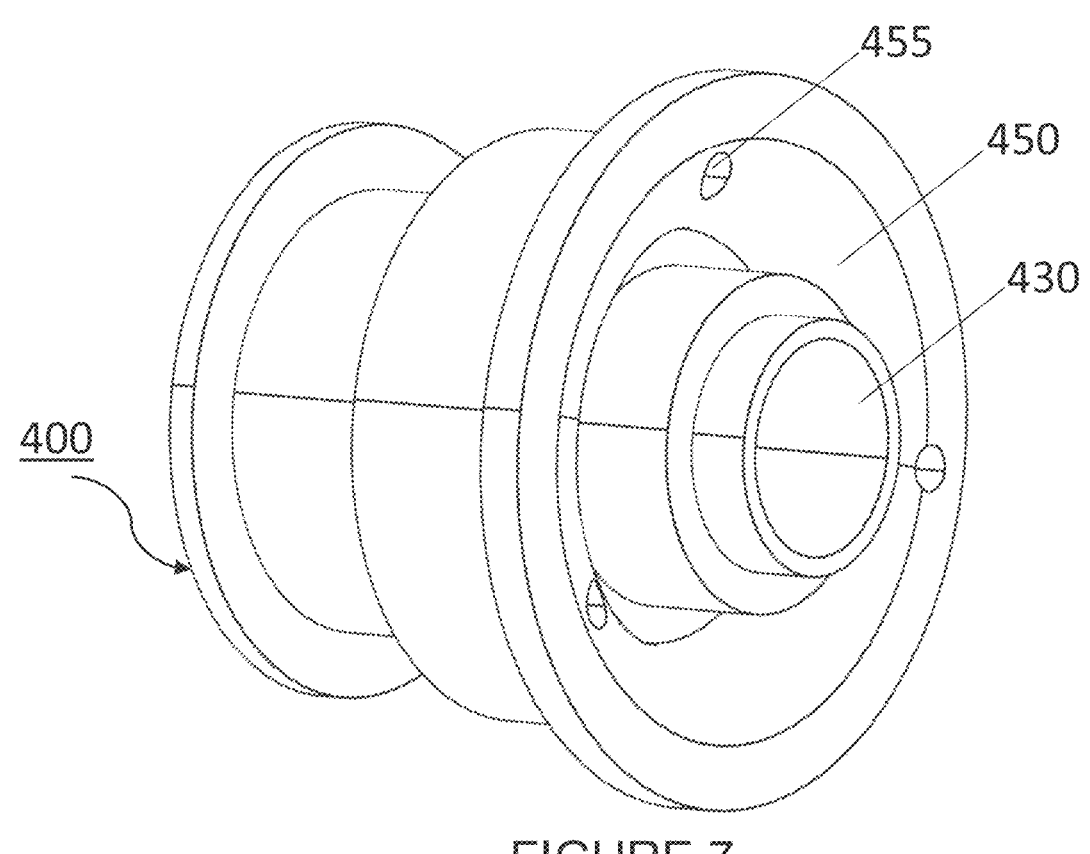
FIG. 7 illustrates a first view of an example field coil.
Figure 8:
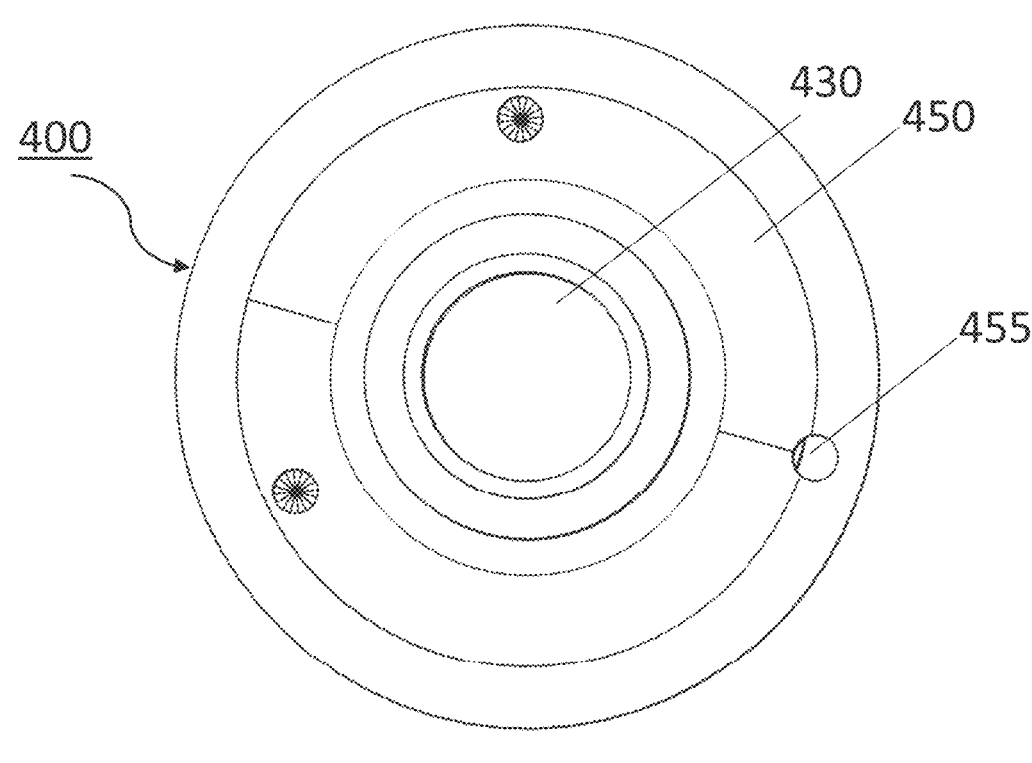
FIG. 8 illustrates another view of the field coil of FIG. 7.

Axial ends of the brushless rotor 300 are provided with integrally formed air flow directing vanes 350 that are circumferentially arranged at the axial ends of the brushless rotor 300 and shaped to draw air through vents provided in walls of the housing assembly and directing the air in a radially inward direction towards the rotational axis of the drive shaft 330 when the rotor 300 undergoes rotation. Referring to FIGS. 2 and 5, each pole piece 310 and 320 includes a pole yoke 311 and 322 respectively which defines an axially facing surface, with the pole fingers 312 extending axially from the pole yoke such that the flow directing vanes 350 are integrally formed with the pole yoke of the brushless rotor 300. The pole yoke region for the brushless rotor 300 is relatively thicker. The provision of the integrally formed vanes 350 allow additional volume to be used within the pole yoke regions 312 and 322 of the brushless rotor 300 which in turn allows more magnetic material to be used within the brushless rotor thereby increasing the magnetic field strength without affecting the overall volume occupied by the brushless alternator 100.

Referring to FIG. 5, each of the vanes 350 comprises a leading edge 352 and trailing portion 354 formed integrally with the yoke of the brushless rotor 300 with a pair of planar and oppositely arranged air flow directing surfaces 356 and 358 of the vane 350 extending between the leading edge 352 and the trailing portion 354. Each of the vanes 350 are circumferentially arranged and shaped to draw air through vents provided in walls of the housing assembly 4 and directing the air in a radially inward direction towards the rotational axis of the drive shaft 330 when the rotor 300 undergoes rotation. The oppositely arranged air flow directing surfaces 356 and 358 are defined by an outer edge portion 353 and an inner edge portion 355 wherein the outer edge portion is located at a circumferentially outer location and wherein the inner edge is located at a radially inner portion. A first plurality of the vanes 350 are provided to surround the field coil 400 (when the field coil 400 is positioned in the cavity 340) at a first axial end of the brushless rotor 300 and a second plurality of the vanes are provided to surround the field coil 400 at the second axial end of the brushless rotor 300.

Figure 3:
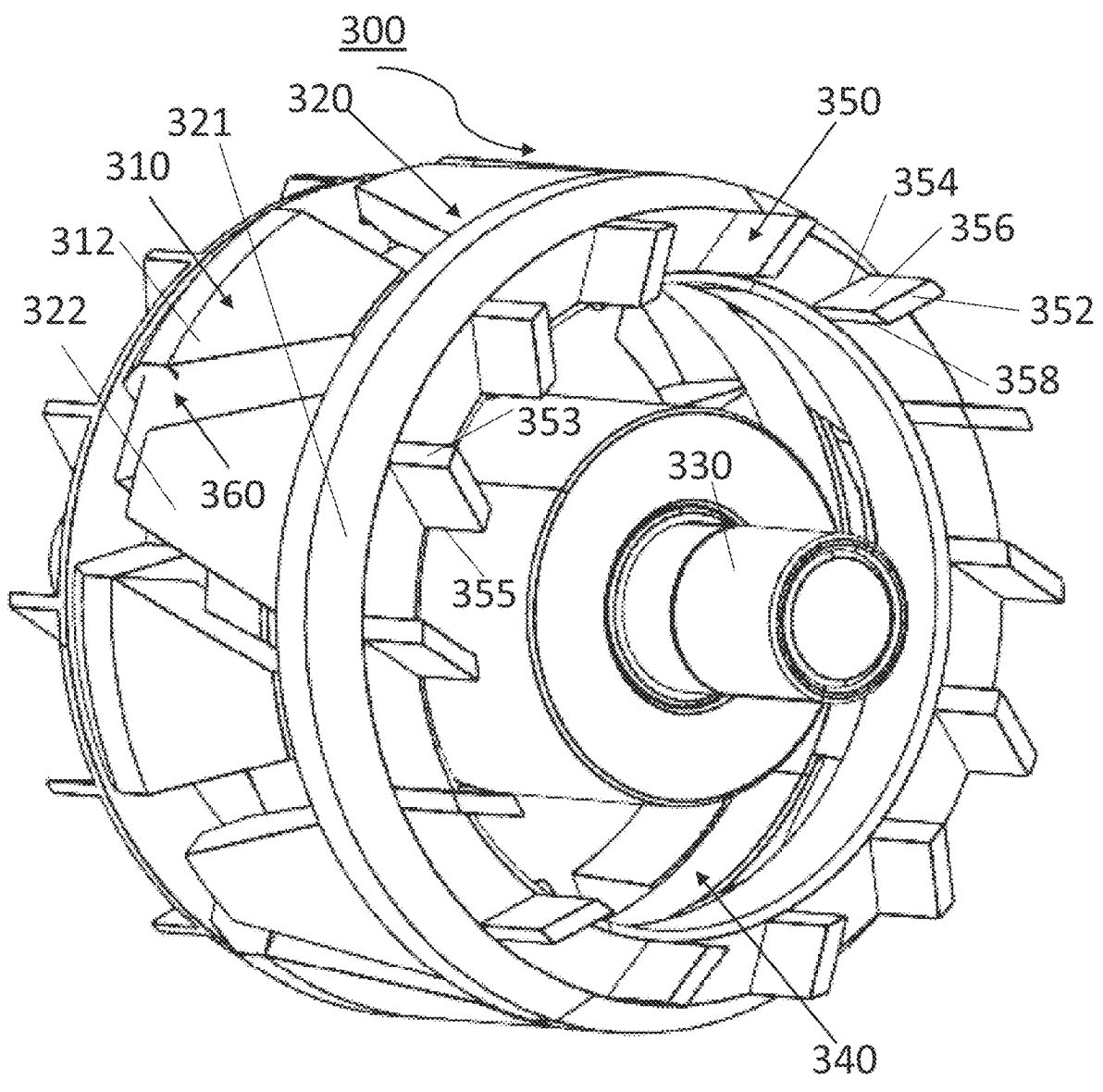
FIG. 3 illustrates another view of the rotor of FIG. 2.
Figure 4:
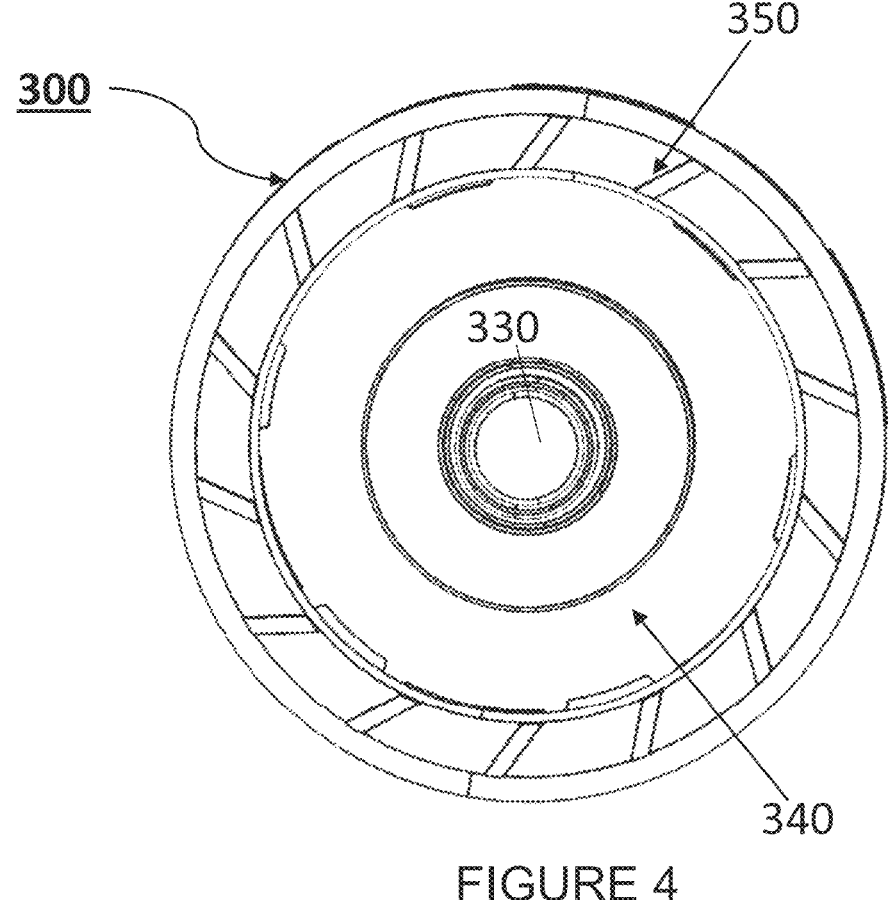
FIG. 4 illustrates another view of the rotor of FIG. 2.

Referring particularly to FIGS. 3 and 5, the pole fingers 312 and 322 comprise a trapezoidal shape which extend axially from an extreme radial outer edge of each of the pole piece (also referred to as the yoke 311 and 321 in previous sections) towards the other pole piece. Each pole finger of a pole piece is situated in a space defined between two consecutive pole fingers of the other pole piece and an interpole space magnetic assembly 360 is disposed in at least one interpole space between a pair of adjacently located pole fingers of the first and second pole piece. Grooves are provided along the sides of each of the pole fingers 312 and 322 to allow the interpole magnetic assembly 360 to be disposed within the interpole space to further increase the overall volume of magnetic material used for the brushless rotor 300. The interpole space magnetic assembly 360 comprises magnetic material that can be received in a groove located in spaced edge portions of the pair of adjacently located pole fingers. The interpole space magnetic assembly comprises a first lateral portion 362 adapted to be engaged with a first of the pair of the pole fingers 312 and 322 and a second lateral portion 364 adapted to be engaged with a second of the pair of pole fingers 312 and 322 such that the first and second lateral portions have opposite polarities. In the preferred embodiment, interpole piece 360 comprises a T shaped configuration with a portion of the interpole piece being positioned in close proximity with a respective yoke portion (311 or 321). It is important to note that the number of interpole pieces 360 used for each brushless rotor 300 may vary in accordance with the desired electrical output requirements of the brushless rotor 300. Therefore, a number of interpole pieces 360 may be added in between any pair of adjacent pole fingers 312 and 322 to increase the overall magnetic field strength imparted by the brushless rotor 300.

The provision of the interpole pieces 360 and the integrally formed vanes 350 in combination with the field coil 400 being positioned in an internal cavity 340 provides a novel configuration for a brushless alternator 300 that can be easily assembled by starting from a commercially available brushed alternator (such as brushed alternator 10).

Figure 11:
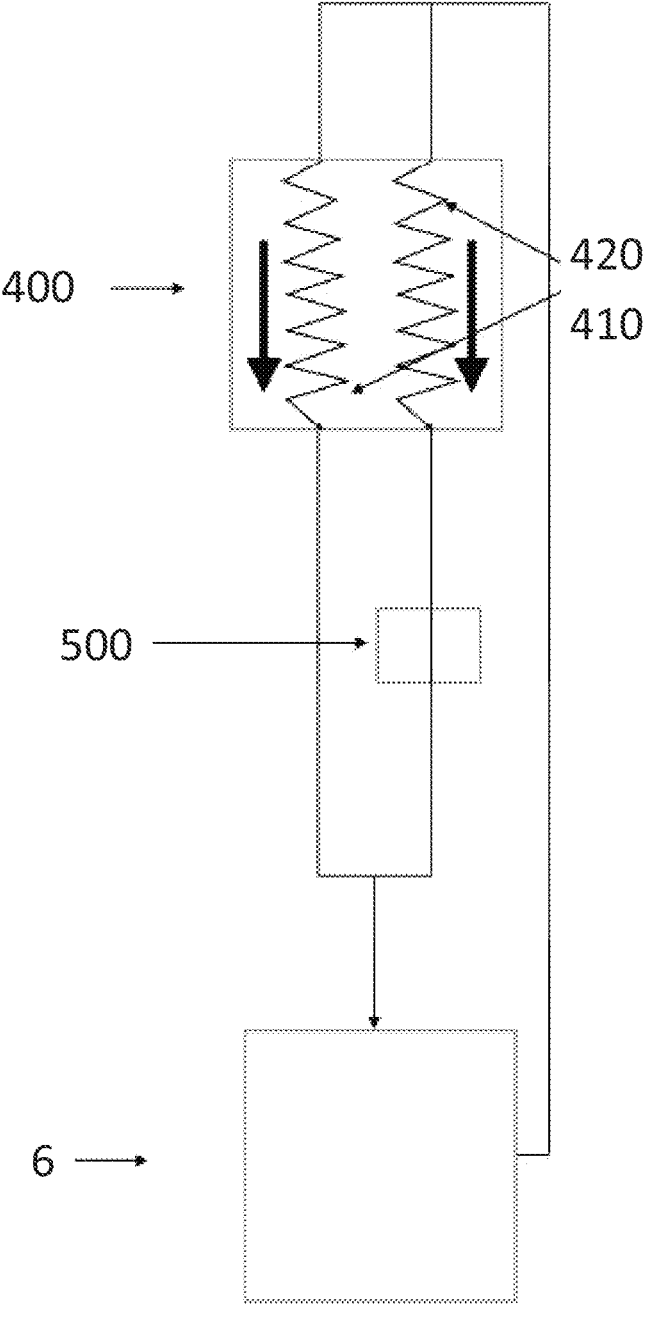
FIG. 11 illustrates a diagram of portions of an example alternator assembly.

Referring to FIG. 11, the field coil 400 comprises a first field winding 410 electrically connected with a second field winding 420 by a switching arrangement 500. FIG. 11 depicts a method of providing the field coil 400 in the brushless alternator 100 for controlling alternator temperature. The first field winding is connected to the voltage regulator 6 in the conventional manner. The second coil 420 is connected in parallel with the first coil 410. The switching arrangement 500 comprises a thermal switch which remains in a closed (or conducting position) when the alternator temperature is within an acceptable range or below an acceptable limit. In the normally closed position, thermal switch of the switching arrangement 400 is connected in series with the second coil 420. It is envisioned that the thermal switch can be placed in various positions within the internal volume of the alternator 100. During normal operation of the alternator 100, coils 410 and 420 of the Field Coil 400 are both energised by the regulator 6 and alternator will function at full capacity. The coils 410 and 420 can have various resistances and numbers of turns and may or may not have equal resistance and turns. When one or more sensors sense that the alternator temperature has exceeded the activation temperature of the thermal switch, coil 420 will be de-energised and the alternator excitation field strength will be reduced. Due to this reduction in excitation field strength, the alternator output will be reduced. The alternator 100 will return to normal function when the alternator temperature returns to the pre-activation temperature of the thermal switch which once again results in the switch being closed.

Figure 12:
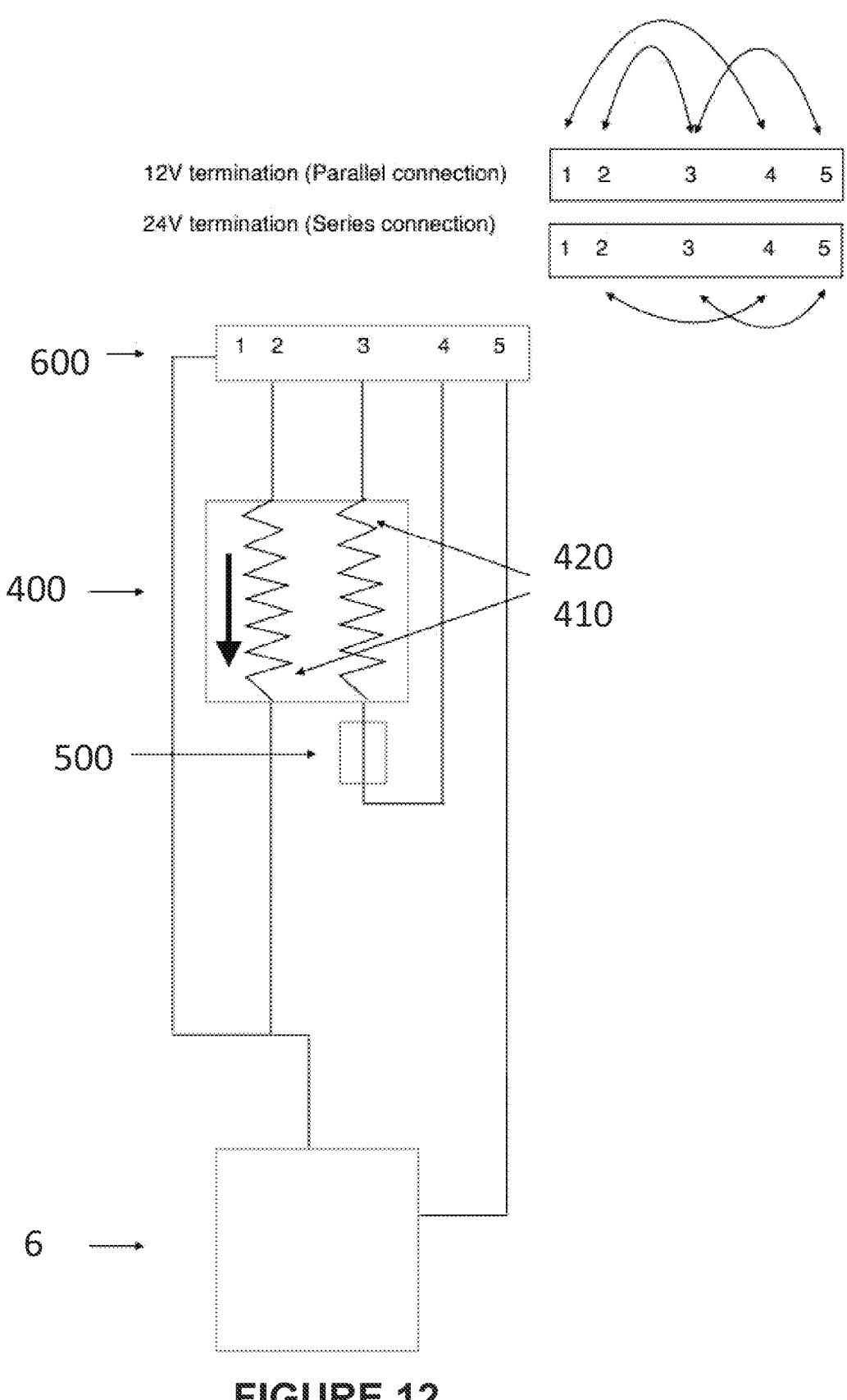
FIG. 12 illustrates another diagram of portions of an example alternator assembly.

Referring to FIG. 12, the field coil 400 with the first and second coil windings 410 and 420 are configured to provide a multi-voltage operation to enable the user to switch between two different outputs. In the present embodiment, the alternator output may be readily switched between 12V and 24V from the same brushless alternator 100. The field coil 400 is wound with two coils 410 and 420 that are of equal resistance and Amp/Turns. The coils 410 and 420 are terminated an electrical terminal assembly 600 in such a manner that allows for either a parallel or series connection to be made at the alternator. The parallel connection arrangement of the exciter coils 410 and 420 will allow the alternator to function as a 12V device. The series connection arrangement of the exciter coils 410 and 420 allows the alternator to function as a 24V device. The user may use the terminal assembly 600 for selecting between the parallel and series configurations. The series or parallel connection is made via placing a configured connector 600 into a corresponding external-mounted receptacle at the alternator 100 as per the wiring arrangement shown in FIG. 12. A normally closed thermal switch 500 is also connected in series with the second coil to allow for the thermal protection outlined in the previous sections to be employed by allowing the second coil 420 to become electrically discounted when the alternator temperature exceeds the activation of the thermal switch.

Figure 13:
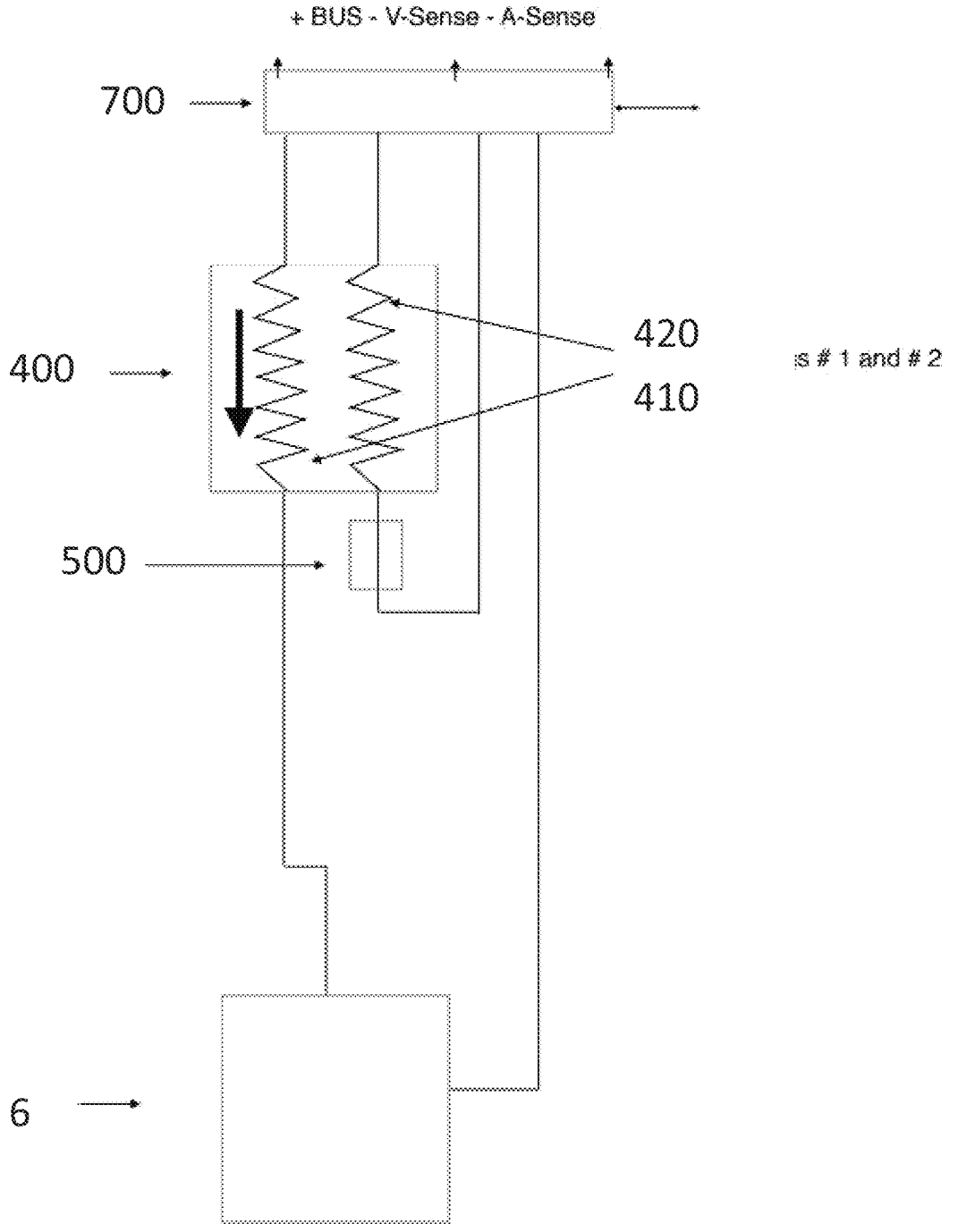
FIG. 13 illustrates another diagram of portions of an example alternator assembly.

Referring to FIG. 13, the field coil 400 with the two coil windings 410 and 420 is shown for use in a method for increasing the output of a brushless alternator 100 at low RPM and for also reducing the output of the same brushless alternator 100 at High RPM. Once again, the alternator exciter-field coil 400 is wound with two coils 410 and 420 of different resistance and Amp/Turns B. The first coil 410 is wound in such a manner that allows for full normal-output capacity. This coil is connected to the Voltage regulator 6. The second coil 420 is wound in such a manner that it significantly boosts the excitation current when electrically connected with the first coil 410. The second coil 420 is not connected to the regulator 6. Instead, the second coil 420 is connected to a Buck-Boost controller module 700. When extra-large alternator outputs are required (in situations where the rotor RPMs are low) the second coil 420 is connected to the system voltage so that it draws maximum current. This second coil 420 when connected via the buck boost controller module 700 assists the first coil 410 that is connected to the voltage regulator 6 by increasing the magnetic flux of the field coil 400. If the system voltage exceeds a pre-set or predetermined system voltage limit (such as: ~14 VDC for 12V systems/~28 VDC for 24V systems) the second coil 420 is de-energised. G. If the alternator 100 is operating at High RPM and the loads applied to the alternator exceed the capacity of the alternator, Coil 420 is energised in the opposite polarity relative to the first coil 410. Changing the polarity of the second coil 420 reduces the magnetic flux produced by the field coil 400, which in turn reduces the output of the alternator. Once again, the thermal switch forms part of the switching arrangement 500 and is connected in series with the second coil 420 to allow for the thermal protection outlined in the previous sections.

Figure 14:
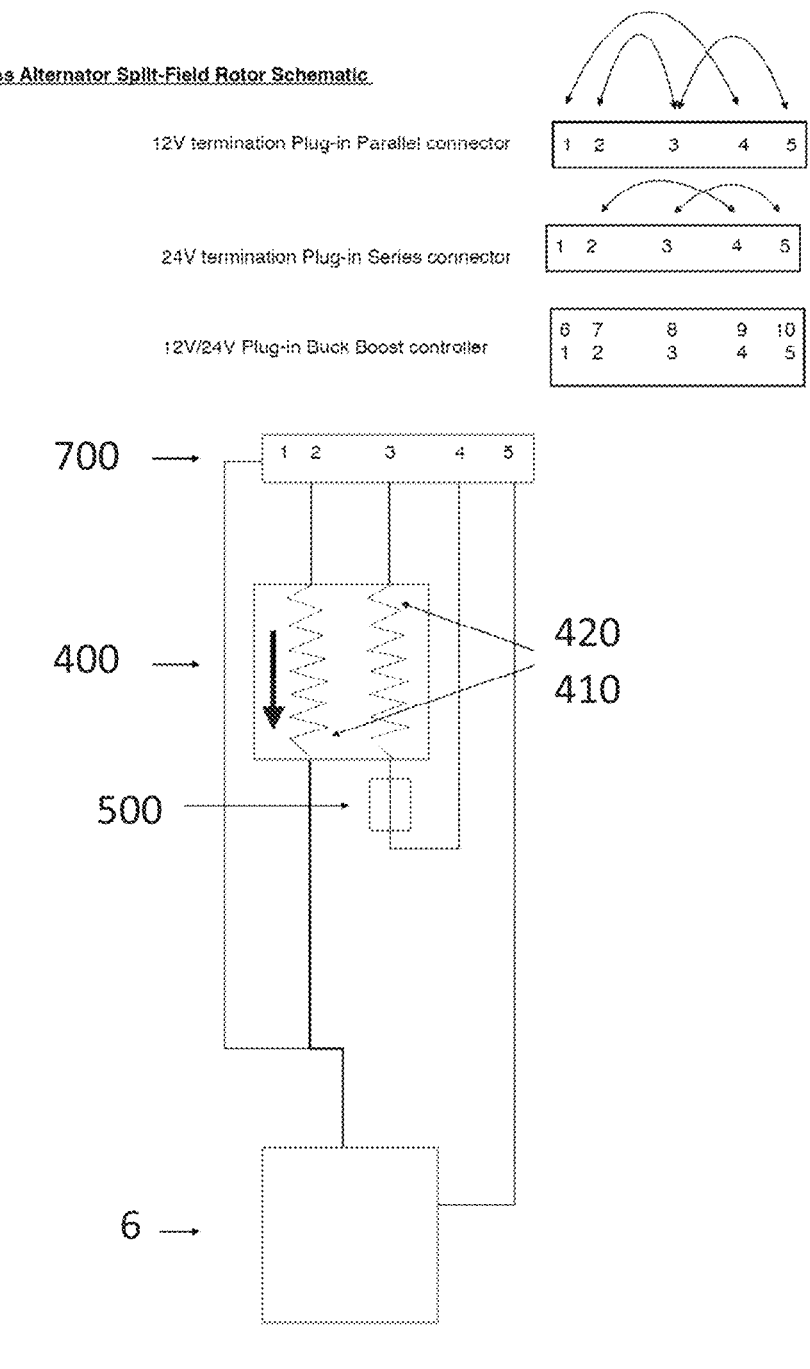
FIG. 14 illustrates another diagram of portions of an example alternator assembly.

Referring to FIG. 14, a schematic diagram showing a combination of the thermal switching arrangement 500 (shown separately in FIG. 11) with the multiple voltage operation arrangement (shown separately in FIG. 12) and the boosting arrangement (shown in FIG. 13) in the same alternator assembly. Like reference numerals denote like features that have been previously described in the earlier sections.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

9

The invention claimed is:

1. A vehicle brushless alternator assembly comprising:
a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil; and
a cylindrical stator comprising an armature enveloping the magnetic claw poles, the stator arranged coaxially relative to a drive shaft;
the field coil structured to be positioned coaxially in an internal cavity of said rotor to arrange the field coil in a spaced relationship relative to said rotor to generate magnetic flux upon being energized,
the field coil comprising at least a first field winding electrically connected with at least a second field winding by a switching arrangement such that:
in a first operable configuration the switching arrangement operates to electrically connect the first and second field windings in series during energization; and
in a second operable configuration the switching arrangement operates to electrically connect the first and second field windings in parallel during energization, wherein the vehicle brushless alternator assembly further comprises sensor assembly operatively coupled to the switching arrangement for switching between the first and second operable configuration in response to sensing changes in one or more predetermined parameters.

2. The vehicle brushless alternator assembly in accordance with claim 1, wherein the sensor assembly comprises one or more temperature sensors such that when temperature sensed by the one or more temperature sensors exceeds a predetermined limit, the switching arrangement switches the field coil from the first operable configuration to the second operable configuration.

3. The vehicle brushless alternator assembly in accordance with claim 2, wherein the one or more temperature sensors are positioned within an internal volume of a housing enclosing the stator and the rotor.

4. The vehicle brushless alternator assembly in accordance with claim 3, wherein terminal ends of the first and second field winding terminate on a connector assembly positioned relative to the housing to allow a user to switch between the first and second operable configurations.

5. The vehicle brushless alternator assembly in accordance with claim 4, wherein the connector assembly comprises a plurality of electrical terminals such that:
electrically connecting a set of the terminals in a first sequence results in operation of the switching arrangement in the first operable configuration; and
electrically connecting a second set of the terminals in a second sequence results in operation of the switching arrangement in the second operable configuration.

6. The vehicle brushless alternator assembly in accordance with claim 1, wherein each of the first field winding and the second field winding provide substantially equal electrical resistance to a flow of current.

7. The vehicle brushless alternator assembly in accordance with claim 1, wherein at least the first field winding is electrically connected to a voltage regulator and wherein the second field winding is not electrically connected to a voltage regulator.

8. The vehicle brushless alternator assembly in accordance with claim 1, further comprising a housing assembly surrounding said cylindrical stator with the drive shaft being supported by the housing assembly wherein the field coil is fixedly mounted to the housing assembly.

9. A vehicle brushless alternator assembly comprising:
a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil; and
a cylindrical stator comprising armature enveloping the magnetic claw poles, the stator arranged coaxially relative to a drive shaft;
the field coil structured to be positioned coaxially in an internal cavity of said rotor to arrange the field coil in a spaced relationship relative to said rotor to generate magnetic flux upon being energized, the field coil comprising at least a first field winding electrically connected with at least a second field winding by a switching arrangement such that:
in a first operable configuration the switching arrangement operates to electrically connect the first and second field windings in series during energization; and
in a second operable configuration the switching arrangement operates to electrically disconnects the second field winding from the first field winding to result in energization of the first field winding without energizing the second field winding,
wherein the vehicle brushless alternator assembly further comprises a sensor assembly operatively coupled to the switching arrangement for switching between the first and second operable configuration, in response to sensing changes in one or more predetermined parameters.

10. A vehicle brushless alternator assembly comprising:
a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of a field coil; and
a cylindrical stator comprising armature enveloping the magnetic claw poles, the stator arranged coaxially relative to a drive shaft;
the field coil structured to be positioned coaxially in an internal cavity of said rotor to arrange the field coil in a spaced relationship relative to said rotor to generate magnetic flux upon being energized, the field coil comprising at least a first field winding electrically connected with at least a second field winding,
wherein the second field winding is electrically connected to a boost controlling module, the boost controlling module being arranged to:
energize the second field winding, in a boosting mode, to increase the magnetic flux generated by the field coil;
energize the second field winding in an opposite polarity relative to the first field winding, in a reductive mode, to reduce the magnetic flux generated by the field coil; and
wherein the first field winding is electrically connected with the second field winding by a switching arrangement such that:
in a first operable configuration the switching arrangement operates to electrically connect the first and second field windings in parallel during energization; and in a second operable configuration the switching arrangement operates to electrically connect the first and second field windings in parallel during energization, wherein the vehicle brushless alternator assembly further comprises a sensor assembly operatively coupled to the switching arrangement for switching between the first and second operable configuration, in response to sensing changes in one or more predetermined parameters.

\*  \*  \*  \*  \*